United States Patent [19]

Showalter

[11] Patent Number: 5,499,951
[45] Date of Patent: Mar. 19, 1996

[54] DYNAMIC RANGE SHIFT TRANSFER CASE WITH ELECTROMAGNETIC CLUTCH FOR COUPLING ONE OUTPUT TO THE INPUT FOR MODULATING TORQUE SPLIT

[75] Inventor: Dan J. Showalter, Plymouth, Mich.

[73] Assignee: Borg-Warner Automotive, Inc., Sterling Heights, Mich.

[21] Appl. No.: 101,140

[22] Filed: Aug. 2, 1993

[51] Int. Cl.⁶ .......................... F16H 37/08; F16H 48/06
[52] U.S. Cl. ...................... 475/204; 475/221; 74/665 GE
[58] Field of Search .................................. 475/204, 206, 475/150, 221, 223, 225; 180/248, 249; 74/665 GE

[56] References Cited

U.S. PATENT DOCUMENTS

| | | | |
|---|---|---|---|
| 3,848,691 | 11/1974 | Dolan | 475/221 X |
| 4,484,654 | 11/1984 | Hayakawa | 180/247 |
| 4,718,303 | 1/1988 | Fogelberg | 74/665 GE |
| 4,860,612 | 8/1989 | Dick et al. | 74/665 |
| 4,876,919 | 10/1989 | Negano et al. | 180/247 |
| 4,989,686 | 2/1991 | Miller et al. | 180/197 |
| 5,106,351 | 4/1992 | Williams et al. | 475/250 |
| 5,159,847 | 11/1992 | Williams et al. | 74/337.5 |
| 5,226,860 | 7/1993 | Baxter, Jr. et al. | 475/221 X |
| 5,271,479 | 12/1993 | Kawahara et al. | 180/249 |
| 5,275,253 | 1/1994 | Sperduti et al. | 475/221 X |
| 5,286,238 | 2/1994 | Shimizu et al. | 475/221 |
| 5,334,116 | 8/1994 | Baxter, Jr. | 180/248 X |

FOREIGN PATENT DOCUMENTS

| | | |
|---|---|---|
| 0577256A1 | 1/1994 | European Pat. Off. . |
| 59-206228 | 11/1984 | Japan ............ 475/150 |
| 2198493 | 6/1988 | United Kingdom . |

OTHER PUBLICATIONS

Search Report for GB 9411910.4 dated Aug. 24, 1994.

*Primary Examiner*—Khoi Q. Ta
*Attorney, Agent, or Firm*—Willian Brinks Hofer et al.; Greg Dziegielewski

[57] ABSTRACT

A two speed transfer case includes a spring biased dog clutch connecting a shift sleeve to a main input shaft and an electromagnetic friction clutch for transferring torque from the shift sleeve to one of the outputs. This arrangement allows dynamic upshifts and downshifts and modulation of the torque split between the outputs.

11 Claims, 2 Drawing Sheets

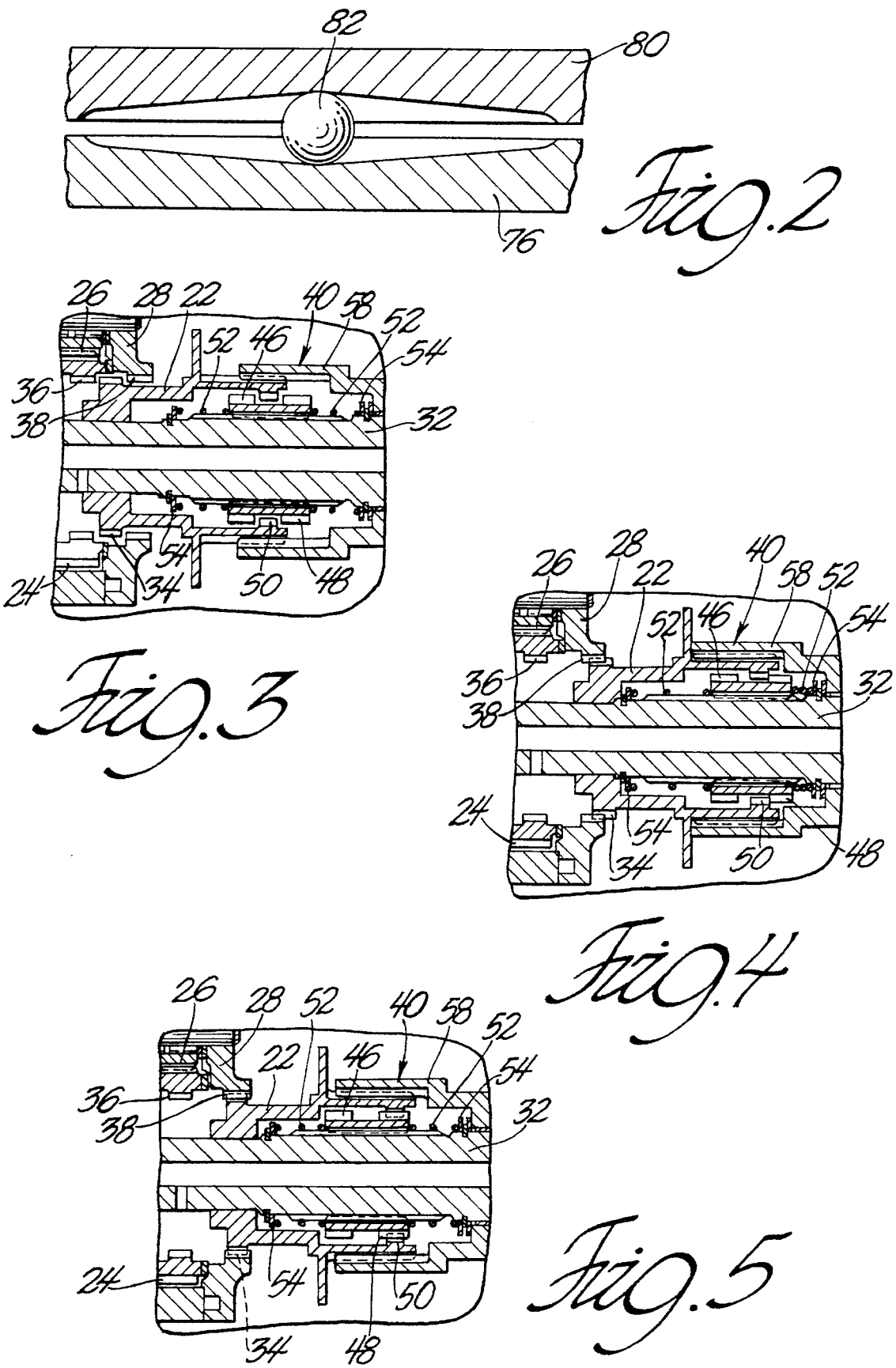

DYNAMIC RANGE SHIFT TRANSFER CASE WITH ELECTROMAGNETIC CLUTCH FOR COUPLING ONE OUTPUT TO THE INPUT FOR MODULATING TORQUE SPLIT

BACKGROUND OF THE INVENTION

This invention relates generally to transfer cases and more particularly to two speed transfer cases that include a speed change gear set to provide low speed range and high speed range operation.

In general, there are two basic types of power transfer mechanisms, such as transfer cases, that are operatively associated with both manual and automatic transmissions for directing power to the four wheels of a motor vehicle. These are the full time or all wheel drive type in which all four wheels of the vehicle are driven and the part time type in which two wheels are normally driven and the other two wheels are selectively driven.

Many automotive transfer cases, particularly those of the part time type, are equipped with a speed change gear set or the like for operating in low and high speed ranges in conjunction with two wheel drive and four wheel drive operating modes. These transfer cases include a shift mechanism for moving a shift sleeve or the like back and forth between a high speed range position that usually provides direct drive and a low range speed position that usually provides reduced ratio drive. See for instance U.S. Pat. No. 5,159,847 granted to Randolph C. Williams Nov. 3, 1993 for a sector plate for a transfer case. The shift mechanism of this particular transfer case cannot be operated unless the vehicle is stopped. However, it is known that mechanical synchronizers can be incorporated into two speed transfer cases to allow dynamic shifting while the vehicle is in motion.

However transfer cases are rotationally secured to the output shaft of the vehicle transmission and therefore have a relatively high rotational inertia reflected to the input shaft of the transfer case. This high reflected moment of inertia combined with the limited torque capacity of a mechanical synchronizer limits dynamic shifting to very low vehicle speeds.

On the other hand, many transfer cases, particularly those of the full time type, are equipped with a differential that allows the outputs to turn at different speeds. These differentiated transfer cases split the input torque between the respective outputs for the front and rear wheels of the automobile according to the physical characteristics of the differential. However, it is also known that the torque split between the two outputs can be modulated to meet certain operating conditions. U.S. Pat. No. 4,718,303 granted to Mark J. Fogelberg Jan. 12, 1988 discloses such a differentiated transfer case which includes an electromagnetic friction clutch which operates on the two outputs to modulate the torque split between the front and rear drive axles of the vehicle. This modulatable friction clutch allows the transfer case to easily and readily adapt to changing vehicle conditions without detracting from its four wheel drive capabilities. Also see U.S. Pat. No. 4,989,686 granted to Alan L. Miller et al Feb. 5, 1991 for a system for controlling torque transmission in a four wheel drive vehicle.

Another type of transfer case is the on demand type which can be considered a species of the part time type. In this type two wheels are normally driven and the other two wheels are automatically driven in response to an external stimulus such as slippage of the normally driven wheels. These on demand type transfer cases customarily include a friction type clutch, such as a viscous coupling connecting two elements of the differential that allows the two outputs to turn at different speeds up to a predetermined speed differential according to the physical characteristics of the friction clutch.

The torque split between the two outputs of these on demand type transfer cases can be modulated by using an electromagnetic friction clutch as disclosed in U.S. patent application Ser. No. 07/903,696 filed Jun. 24, 1992, now U.S. Pat. No. 5,407,024, and U.S. patent application Ser. No. 08/100,560 filed Jul. 30, 1993, now U.S. Pat. No. 5,409,429, both of which are hereby incorporated in this patent specification by reference.

It should also be noted that the electromagnetic friction clutch is incorporated in the transfer case of U.S. patent application Ser. No. 08/100,560 so as to permit dynamic upshifts to an on demand high speed range operating system.

SUMMARY OF THE INVENTION

The object of this invention is to provide a two speed transfer case that can be shifted back and forth between high speed and low speed operation dynamically and that has outputs that can be modulated to meet certain operating conditions in either speed range.

A feature of the two speed transfer case of the invention is that the two speed transfer case incorporates a modulatable friction clutch so that it permits dynamic shifting in both directions as well as modulates the two outputs of the transfer case in either speed range.

In one aspect another feature of the invention is that the two speed transfer case incorporates a modulatable friction clutch in a differentiated two speed transfer case so that it synchronizes both upshifts and downshifts as well as modulates the two outputs of the differential in both speed ranges.

In another aspect, another feature of the invention is that the two speed transfer case incorporates a modulatable friction clutch so that it synchronizes both upshifts and downshifts as well as performs the biasing function in non-differential transfer cases.

Basically the invention comprises placing a modulatable friction clutch between an input shift sleeve and one of the outputs and a spring delayed lock-up hub between the shift sleeve and a main input shaft of a two speed transfer case. This placement allows a frictional torque to be applied between the input shift sleeve and the one output to synchronize the shift sleeve and the main input shaft before they are engaged. The arrangement not only allows dynamic upshifts but also downshifts and modulation of the torque split between the two outputs in both speed operations. The relatively low inertia and drag of the shift sleeve and associated parts of the modulatable friction clutch allows "clash" shifting of the shift sleeve into engagement with the speed change gear set during upshift and downshifts without objectionable noise or tactile feeling to the vehicle operator in most instances. However, a small synchronizer may be used to equalize the speeds of the shift sleeve and the speed change gear being selected if clash shifting is objectionable.

BRIEF DESCRIPTION THE DRAWINGS

The above and other objects, features and advantages of the invention will become more apparent from the following description taken in conjunction with the accompanying drawings wherein like references refer to like parts and wherein:

FIG. 2 is a flat pattern development of a section of one locking ball and associated recesses of coupling rings incorporated in an electromagnetic friction clutch of the two speed transfer case shown in FIG. 1.

FIG. 3 is a fragmentary sectional view of the two speed transfer case showing the shift sleeve in a neutral position.

FIG. 4 is a fragmentary sectional view of the two speed transfer case showing the shift sleeve in a low speed position prior to the lock-up hub being engaged, and FIG. 5 is a fragmentary sectional view of the two speed transfer case showing the shift sleeve in a low speed position with the lock-up hub engaged.

DESCRIPTION OF THE INVENTION

Figure 1:
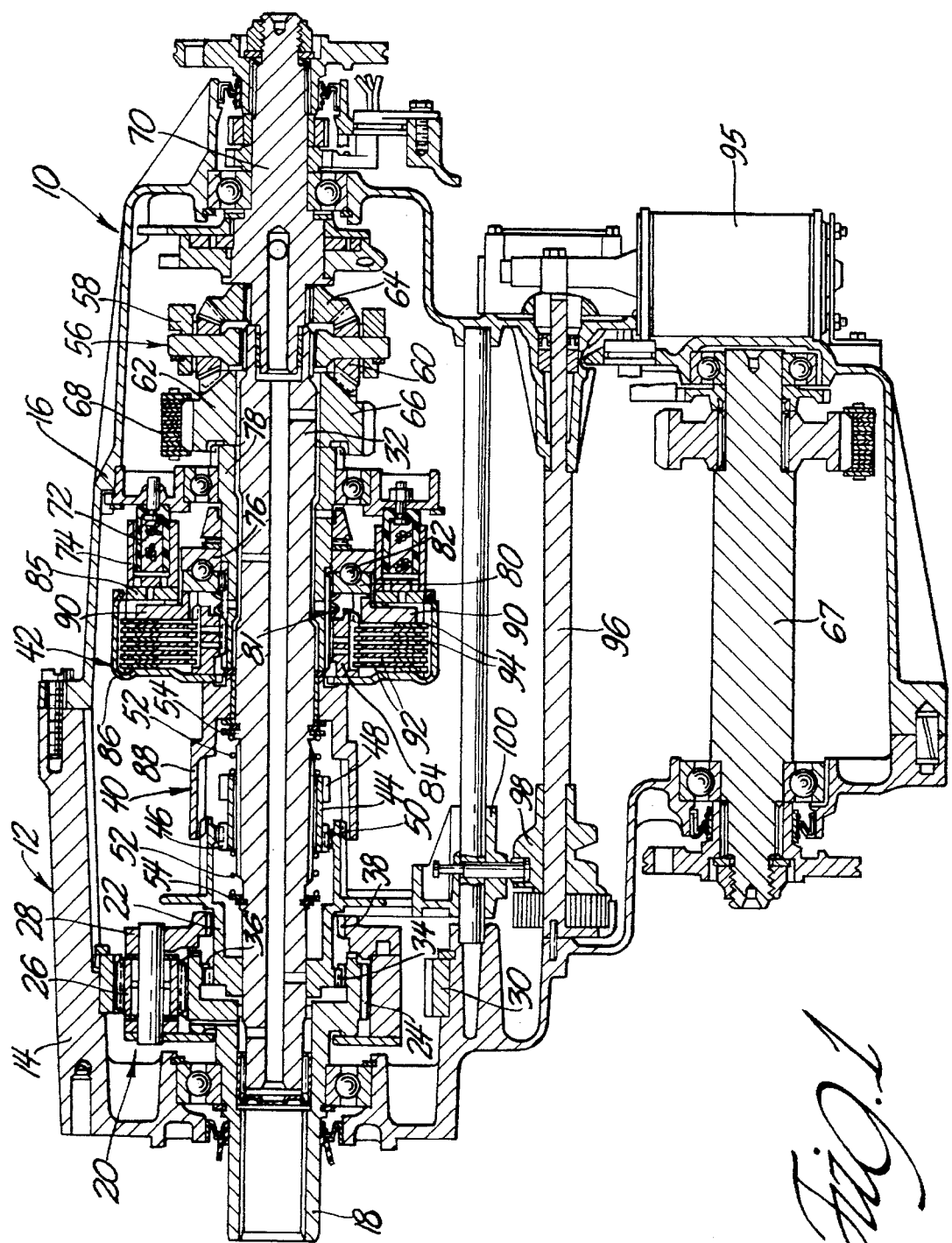
FIG. 1 is a full sectional view of a two speed transfer case according to the present invention showing the shift sleeve in a high speed position.

Referring now to the drawing, FIG. 1 shows an exemplary transfer case 10 which includes a housing assembly 12 formed by front and back housing sections 14 and 16 suitably secured together. Front housing section 14 receives a transmission output shaft (not shown) that is drive connected to an internally splined tubular input stub shaft 18. The transmission output shaft is driven by a power source such as an internal combustion engine of an automobile.

The input stub shaft 18 is part of a speed change unit indicated generally at 20. The speed change unit 20 comprises a planetary gear set and a range shift sleeve 22 having a "High Range" direct drive position shown in FIG. 1 and a "Low Range" reduced ratio drive position shown in FIG. 5. The planetary gear set includes an input sun gear 24 integrally formed on the input stub shaft 18. Sun gear 24 is meshed with a plurality of planet gears 26 (one shown) that are individually journalled on a planetary carrier 28. The planet gears 26 mesh with a ring gear 30 that is non-rotatably secured in the housing 12.

The shift sleeve 22 is slidably mounted on the end of a main input shaft 32. The shift sleeve 22 has external gear teeth 34 at one end that engage internal gear teeth 36 of the input stub shaft 18 when the shift sleeve 22 is in the High Range position which is shown in FIG. 1 thus establishing a direct 1:1 ratio drive from the input stub shaft 18 to the shift sleeve 22.

Alternatively, these external gear teeth 34 engage internal gear teeth 38 of the planetary carrier 28 when the shift sleeve 22 is in the Low Range position which is shown in FIG. 5 thus establishing a reduction ratio drive from the stub shaft 18 to the shift sleeve 22 via the planet gears 26 and the planetary carrier 28.

The transfer case 10 further includes a positive or dog clutch 40 for drive connecting the shift sleeve 22 to the main input shaft 32 and an electromagnetic friction clutch 42 for transferring torque from the shift sleeve 22 to one of the outputs of the transfer case 10 as explained below.

The dog clutch 40 comprises an internally splined lock-up hub 44 that is slidably mounted on external splines of the main input shaft 32 and disposed inside an enlarged portion of the range shift sleeve 22. The lock-up hub 44 has two axially spaced sets of gear teeth 46 and 48 that are engageable with an internal set of gear teeth 50 of the range shift sleeve 22. The lock-up hub 44 is axially located on the main input shaft 32 by two coil springs 52 that engage opposite ends of the lock-up hub 44 and react against respective retaining rings 54 carried by the main input shaft 32.

The slidably mounted hub 44 and the coil springs 52 provide a delay mechanism which delays engagement of the drive connection between the shift sleeve 22 and the main input shaft 32. This time delay mechanism cooperates with the electromagnetic friction clutch 42 to permit dynamic shifting of the shift sleeve 22 back and forth between the high range and low range positions. This is explained in more detail below.

The electromagnetic friction clutch 42 is physically located between the range shift sleeve 22 and a differential gear set 56. The exemplary differential gear set 56 that is illustrated is a bevel gear differential comprising a differential case or carrier assembly 58 that is attached to an end portion of the main input shaft 32 by splines. The carrier assembly 58 carries a plurality of bevel pinion gears 60 that are individually journalled on radial pins forming part of the differential case assembly 58. The bevel pinion gears 60 mesh with two side gears 62 and 64 that are located on opposite sides of the bevel pinion gears 60. The side gears 62 and 64 are mounted for relative rotation with respect to the main input shaft 32 and with respect to each other.

Side gear 62 forms an integral part of a sprocket 66 which drives an offset output shaft 67 in the lower part of the transfer case 10 via a chain 68. The offset output shaft 67 usually drives the front axle of a four wheel drive vehicle via a front axle differential (not shown). Side gear 64 is drive connected to a coaxial output shaft 70 by splines for driving the rear axle via a rear axle differential (not shown). The differential gear set 56 operates in a well known manner to split the torque received from the main input shaft 32 between the output shafts 67 and 70 via the respective side gears 62 and 64. The differential gear set 56 is commonly referred to as a center or interaxle differential because the output shafts 67 and 70 drive axle assemblies that usually include their own differentials to accommodate side-to-side speed variations.

As mentioned above, the transfer case 10 further includes an electromagnetic friction clutch 42 which transfers torque from the shift sleeve 22 to one of the outputs of the transfer case 10. Thus the electromagnetic friction clutch 42 serves as a biasing clutch for modulating torque transfer through the differential gear set 56. That is, the electromagnetic friction clutch 42 conditionally and operationally adds or subtracts torque delivered to the respective output shafts 67 and 70. The friction clutch 42 also cooperates with the delay mechanism comprising the lock-up hub 44 and coil springs 52 to allow dynamic shifting of the shift sleeve 22 as indicated above.

In the preferred embodiment, the electromagnetic friction clutch 42 is comprised of a stationary magnetic coil 72 which is suitably arranged within the housing 16 and which is partially surrounded by a soft iron rotor 74. Electric conductors or cables (not shown) provide clutch current to the magnetic coil 72 to generate a magnetic flux. The rotor 74 is formed with a suitably slotted end face and it is attached to an inner ring 76 which rotates on a first extension sleeve 78 that is journalled on the main input shaft 32 and drive connected to the side gear 62 and sprocket 66 at one end.

The rotor 74 is also coupled to the first extension sleeve 78 through a ball ramp coupling that comprises the inner ring 76, an adjacent coupling ring 80 that is splined to the first extension sleeve 78 and a series of loosely movable locking balls 82. The locking balls 82 are entrapped within a series of conically shaped recesses or ramps 83 (FIG. 2) provided on both the inner ring 76 of the rotor 72 and the ring coupling 80 splined to the first extension sleeve 78. An important design aspect of this coupling is that the geometry of the ball ramp design is such that the coupling is not self locking. This is necessary to ensure that the coupling unit does not self engage without application of an additional control input and ensures positive release or modulation capability upon removal or decreased control input.

One or more resilient springs 81 are provided to urge the coupling ring 80 axially toward the inner ring 76 of the rotor 74. Such springs 81 are positioned between end surfaces of the coupling ring 80 and an inner clutch plate collar 84 that is spline connected to the end of the first extension sleeve 78 and held in position by a snap ring. The inner clutch plate collar 84 forms part of the friction clutch portion of the electromagnetic friction clutch 42. This construction automatically positions the rotor 74 so that it does not exert any significant compressive force on the friction clutch 42 when the electromagnet coil 72 is deenergized.

Returning to FIG. 1, the electromagnetic friction clutch 42 further includes a suitably slotted armature or friction disc 85. The disc 85 has external splines which cooperate in a driving relationship with complementary internal splines of a clutch housing 86. The clutch housing 86 has an end wall that is splined to a second extension sleeve 88 that rotates on the main input shaft 32. The second extension sleeve 88 is fixed axially on the main input shaft 32 and slidably and non-rotatably connected to the shift sleeve 22 by matching splines.

The disc 85 is capable of axial displacement relative to the clutch housing 86 and is arranged for friction engagement with the slotted end face of the rotor 74. An annular pressure plate 90 is next to the friction disc 85 and connected to the inner clutch plate collar 84 of the friction clutch 42 by splines. Disposed between the pressure plate 90 and the end wall of the housing 86 is a set of mutually interleaved friction plates or discs 92 and 94 that are splined to the inner clutch plate cellar 84 and the clutch housing 86 respectively.

TORQUE SPLIT MODULATION

In operation, the shift sleeve 22 may be in the high speed range position as shown in FIG. 1 or in the low speed range shown in FIG. 5; and the magnetic coil 72 may be initially deenergized so that there is not any driving connection by way of the electromagnetic friction clutch 42. As such, the torque split to each of the drive axles is determined by the gear geometry of the differential gear set 56 which is 50—50 in the case of the bevel gear differential illustrated. Application of clutch current to the stationary coil 72 generates a magnetic flux which causes the friction disc or armature 85 to be drawn toward the slotted end face of the rotor 74, thereby establishing a frictional driving connection between the rotor 74 and friction disc 85. The friction disc 85 is operatively connected to the main input shaft 32 via the second extension sleeve 88, shift sleeve 22 and lock-up hub 44. Consequently the rotor 74 and the inner coupling ring 76 attached to it turn at the same rotational speed as the main input shaft 32. On the other hand the coupling ring 80 is operatively connected to the offset output stub shaft 67 via the first extension sleeve 78, sprocket 66 and drive chain 68. Consequently the coupling ring 80 turns at the same rotational speed as the offset output shaft 67 and the integral side gear/sprocket 62, 66. If relative motion exists between the main input shaft 32 and the offset output shaft 67 such motion causes the balls 82 to roll up on the conically shaped recesses 83. As such, the coupling mechanism forcibly and axially moves the coupling ring 80 and the pressure plate 90, as a unit, in a manner that presses the friction plates 92 and 94 together with a compression force or wedge action. When pressed together, the friction plates 92 and 94 serve to transmit motive force between the main input shaft 32 which is locked to the shift sleeve 22 and the offset output shaft 67 which is drive connected to the integral side gear/sprocket 62, 66. As such, the friction clutch adds torque to the slower turning of the two side gears 62, 64 and their respective output shafts 67, 70 and subtracts torque from the faster turning or running side gear and output shaft. By modulating the clutch current, the relative rotation of the output shafts 67, 70 may be modulated. That is, with the coupling mechanism being designed to disengage under torque, there must be an additional torque supplied to the preliminary coupling to generate the required axial force for holding the friction plates 92 and 94 in engagement. This torque is supplied by the electromagnetic friction clutch 42.

The level of clutch current supplied to the magnetic coil 72 of the electromagnetic friction clutch 42 controls the bias torque of the clutch 42. That is, precise control over the torque bias can be achieved by increasing or decreasing the clutch current to the electromagnetic coil 72 in response to various parameters. If desired, a predetermined level of clutch current can be continuously provided to the magnetic coil 72. Thus, a consistent torque bias can be applied by the clutch 42. Alternatively, the clutch 42 can respond to a relative wheel slip. Details of a control system for controlling torque bias in response to relative wheel slip are disclosed in U.S. Pat. No. 4,989,686 issued Feb. 5, 1991 and assigned to the same assignee as this application; the full text of which is incorporated herein by reference.

DYNAMIC SHIFT OPERATION

The electromagnetic friction clutch 42 also cooperates with the delay mechanism comprising the lock-up hub 44 and coil springs 52 to allow dynamic shifting of the transfer case 10 back and forth between high speed range and low speed range operation.

Assume that the transfer case 10 is operating in the high range with the range shift sleeve 22 displaced to the left engaging internal gear teeth 36 of input stub shaft 18 and external gear teeth 46 of lock-up hub 44 as shown in FIG. 1.

The following dynamic downshift sequence then takes place when shifting from high speed range to low speed range. The vehicle operator selects low speed range with an electrical switch in the case of an electrically shifted transfer case or begins moving a shift lever towards the low speed range position in the case of a mechanically shifted transfer case. In response a shift control operator 95 rotates shift rod 96 and worm gear 98 which translates yoke 100 and the range shift sleeve 22 to the right as viewed in FIG. 1. The external gear teeth 34 of the range shift sleeve 22 then disengage from the high range gear teeth 36 of the input stub shaft 18 at the same time or near the same time that the range shift sleeve 22 disengages from the teeth 46 of the lock-up hub 44. This disengaged or neutral position is shown in FIG. 3.

It should be noted that the above sequence cannot take place unless the frictional forces in the engaging teeth 36 and 46 resulting from torque that is being applied by the engine to the transfer case 10 via the input stub shaft 18 are less than the forces of the worm gear 98 on the yoke 100 so that the shift sleeve 22 can move to the right from the engaged position shown in FIG. 1 to the neutral position shown in FIG. 3. If the frictional forces are greater, the situation is easily rectified by the vehicle operator releasing the throttle which releases or at least reduces the torque that is applied to the transfer case 10 by the engine. It is also possible to incorporate a throttle position sensor in the shift mechanism, particularly in the case of an electrically shifted transfer case, that allows the shifting sequence to begin only at "tip out" or zero throttle application.

In any event, when the range shift sleeve 22 reaches the neutral position shown in FIG. 3, the translation of the range shift sleeve 22 to the right is continued to engage the gear teeth 34 of the shift sleeve 22 with internal gear teeth 38 of the planetary carrier 28.

Engagement of the chamfered ends of the gear teeth 34 and 38 cause nearly instantaneous acceleration of the two members to a synchronous speed because of the relatively low inertia of the shift sleeve 22 and the associated clutch parts allowing unobjectionable clash engagement in most instances. Alternatively a small synchronizer may be incorporated into the transfer case 10 to equalize the speed of the range shift sleeve 22 with the planetary carrier 28 prior to the engagement of the gear teeth of these two members.

Continued translation of the range shift sleeve 22 past the neutral position also brings the chamfered internal gear teeth 50 of the shift sleeve 22 into contact (with relative rotational movement between the two) with the chamfered ends of the second set of external gear teeth 48 of the lock-up hub 44. The relative rotational speed between the shift sleeve 22 and the lock-up hub 44 prevents engagement of the gear teeth 48 and 50 and axially displaces the lock-up hub 44 against the bias of right hand coil spring 52 initially. Axial displacement of the lock-up hub 44 continues until the gear teeth 34 engage gear teeth 38 to drivingly connect the shift sleeve 22 to the planetary carrier 28 for low speed range operation as shown in FIG. 4. When this drive connection between the range shift sleeve 22 and the planetary carrier 28 is completed, the electromagnetic friction clutch 42 is energized so that the full clutch capacity is utilized to equalize the speed of the planetary carrier 28 with the speed of the offset output shaft 67 that is drive connected to the side gear 62 by the integral sprocket 66. When equalized, the speed of the range shift sleeve 22 is the same or very nearly the same as the speed of the main input shaft 32 which is drive connected with the side gears 62 and 64 of the differential gear set 56. This synchronization allows the right hand spring 52 to move the delayed engagement lock-up hub 44 to the left into meshing engagement with the range shift sleeve 22 to complete the downshift as shown in FIG. 5.

A dynamic upshift, that is shifting from low speed range to high speed range is done in a similar but reversed sequence.

The placement of the electromagnetic friction clutch 42 in the drive path between the shift sleeve 22 and the output shaft 67 allows it to be used for all of its biasing functions as previously described in U.S. Pat. Nos. 4,718,303 and 4,989,686 mentioned above and in pending U.S. patent applications Ser. Nos. 07/903,696 08/100,560 which are discussed in the introduction.

The relatively large torque capacity of the electromagnetic friction clutch 42 allows dynamic shifting between speed ranges under situations previously not possible with conventional mechanical synchronizers. The dynamic speed range shift may even take place without having to place an automatic transmission in neutral when the transfer case 10 is used with an automatic transmission. When the transfer case 10 is used with a manual transmission, dynamic speed range shifts may be possible without having to disengage the engine clutch and most certainly without having to shift the manual transmission into neutral.

When the transfer case 10 is shifted electrically an upper limit must be placed on the shift speed to avoid engine overspeed. When the transfer case 10 is shifted mechanically such limits are also necessary to avoid engine overspeed and to avoid clutch overspeed in the case of a manual transmission.

While the invention has been described in connection with a differentiated two speed transfer case, the invention also applies to a non-differentiated two speed transfer case. Moreover, the invention has been described in connection with an electromagnetic friction clutch which is preferred from a control standpoint. However it is also possible to use any type modulatable friction clutch, for instance a hydraulically actuated friction clutch, that can be controlled in the manner desired. In other words the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. In a transfer case having a speed change gear set, a shift sleeve for engaging different gears of the speed change gear set, a differential having an input and two outputs for driving front and rear drive axles of a motor vehicle respectively and a main input shaft for providing a first drive path from the shift sleeve to the input of the differential, the improvement comprising a modulatable friction clutch providing a second drive path between the shift sleeve and one of the two outputs of the differential so as to modulate torque split between the two outputs and assist in dynamic shifts of the shift sleeve between engagements with different gears of the speed change gear set.

2. In a transfer case having a speed change gear set, a main input shaft, a shift sleeve for connecting different gears of the speed change gear set to the main input shaft, and two outputs for driving front and rear drive axles of a motor vehicle respectively, the improvement comprising a modulatable friction clutch located in a drive path between the shift sleeve and one of the two outputs so as to modulate torque split between the two outputs and assist in dynamic shifts of the shift sleeve between engagements with different gears of the speed change gear set, the shift sleeve being connected to the main input shaft by a delayed engagement lock-up hub that delays connection of the shift sleeve to the main input shaft until substantially synchronous speeds are reached.

3. A dynamic shift two speed transfer case comprising;

a main input shaft that is drivingly connected to two outputs, an input shaft that drives a speed change gear set that provides at least one of a low speed input and a high speed input for the main input shaft, a shift sleeve that is slideably and rotatably mounted with respect to gears of the gear set and the main input shaft for shifting between a low speed range position where the shift sleeve drivingly engages the low speed input and a high speed range position where the shift sleeve drivingly engages the high speed input, a lock-up hub that is slideably mounted with respect to the main input shaft and the shift sleeve and adapted for transferring torque from the shift sleeve to the main input shaft, spring means biasing the lock-up hub in a predetermined axial position, wherein the lock-up hub drivingly connects the shift sleeve and the main input shaft when the shift sleeve is in at least one of the low speed position and the high speed position for transferring torque from the shift sleeve to the main input shaft, and a modulatable friction clutch arranged in a torque transfer relationship between the shift sleeve and one of the two outputs whereby the modulatable friction clutch is positioned for torque biasing the two outputs as well as for assisting dynamic shifting of the shift sleeve between the low speed and the high speed positions.

4. The dynamic shift two speed transfer case as defined in claim 3 wherein the spring means delays the driving connection of the lock-up hub when the shift sleeve is shifted from one range position to another range position until the input of the speed change gear set at the said another range position and the shift sleeve reach substantially synchronous speed by operation of the modulatable friction clutch.

5. The dynamic shift two speed transfer case as defined in claim 4 wherein the modulatable friction clutch is an electromagnetic friction clutch.

6. A dynamic shift two speed transfer case comprising;

a main input shaft, an input stub shaft that drives a speed change gear set that includes a low speed input and a coaxial high speed input for the main input shaft, a shift sleeve that is slideably and rotatably mounted on the main input shaft for shifting between a low speed range position where the shift sleeve drivingly engages the low speed input and a high speed range position where the shift sleeve drivingly engages the high speed input, a lock-up hub that is slideably and rotatably fixed to the main input shaft for transferring torque from the shift sleeve to the main input shaft, spring means biasing the lock-up hub in a predetermined axial position on the main input shaft where the lock-up hub hub drivingly engages the shift sleeve when the shift sleeve is in at least one of the low speed position and the high speed position for transferring torque from the shift sleeve to the main input shaft, a differential gear set having an input connected to the main input shaft and two outputs, and an electromagnetic friction clutch arranged in a torque transfer relationship between the shift sleeve and one of the outputs whereby the electromagnetic friction clutch is positioned for torque biasing the two outputs as well as for permitting dynamic shifting of the shift sleeve between the low speed and the high speed positions in conjunction with the lock-up hub and the spring biasing means.

7. The dynamic shift two speed transfer case as defined in claim 6 wherein the differential gear set is a bevel gear differential having two side gears which are part of the two outputs respectively.

8. The dynamic shift two speed transfer case as defined in claim 7 wherein the speed change gear set is a planetary gear set that is coaxially arranged with the main input shaft.

9. The dynamic shift two speed transfer case as defined in claim 8 wherein the lock-up hub has a first set of teeth that drivingly engage the shift sleeve when it is in the high speed position and a second set of teeth that drivingly engage the shift sleeve when it is in the low speed position.

10. The dynamic shift two speed transfer case as defined in claim 9 wherein the shift sleeve has a single set of teeth that are engaged by the first and second sets of teeth of the shift sleeve.

11. A dynamic shift two speed transfer case comprising, in combination, an input stub shaft driving a speed change gear set having a low speed output and a high speed output, a main input shaft, a shift sleeve slideably and rotatably disposed on said main input shaft for selective coupling to either one of said low speed output or said high speed output of said speed change gear set, a hub slideably and non-rotatably disposed with respect to said main input shaft for transferring torque from said shift sleeve to said main input shaft, spring means for biasing said hub to an axial position on said main input shaft whereby said shift sleeve engages said hub when said shift sleeve is selectiively coupled to either one of said low speed output or said high speed output of said speed change gear set, a differential gear set having an input driven by said main input shaft and a pair of outputs, and an electromagnetic clutch operatively disposed between said shift sleeve and one of said pair of outputs.

* * * * *